United States Patent Office 3,561,920
Patented Feb. 9, 1971

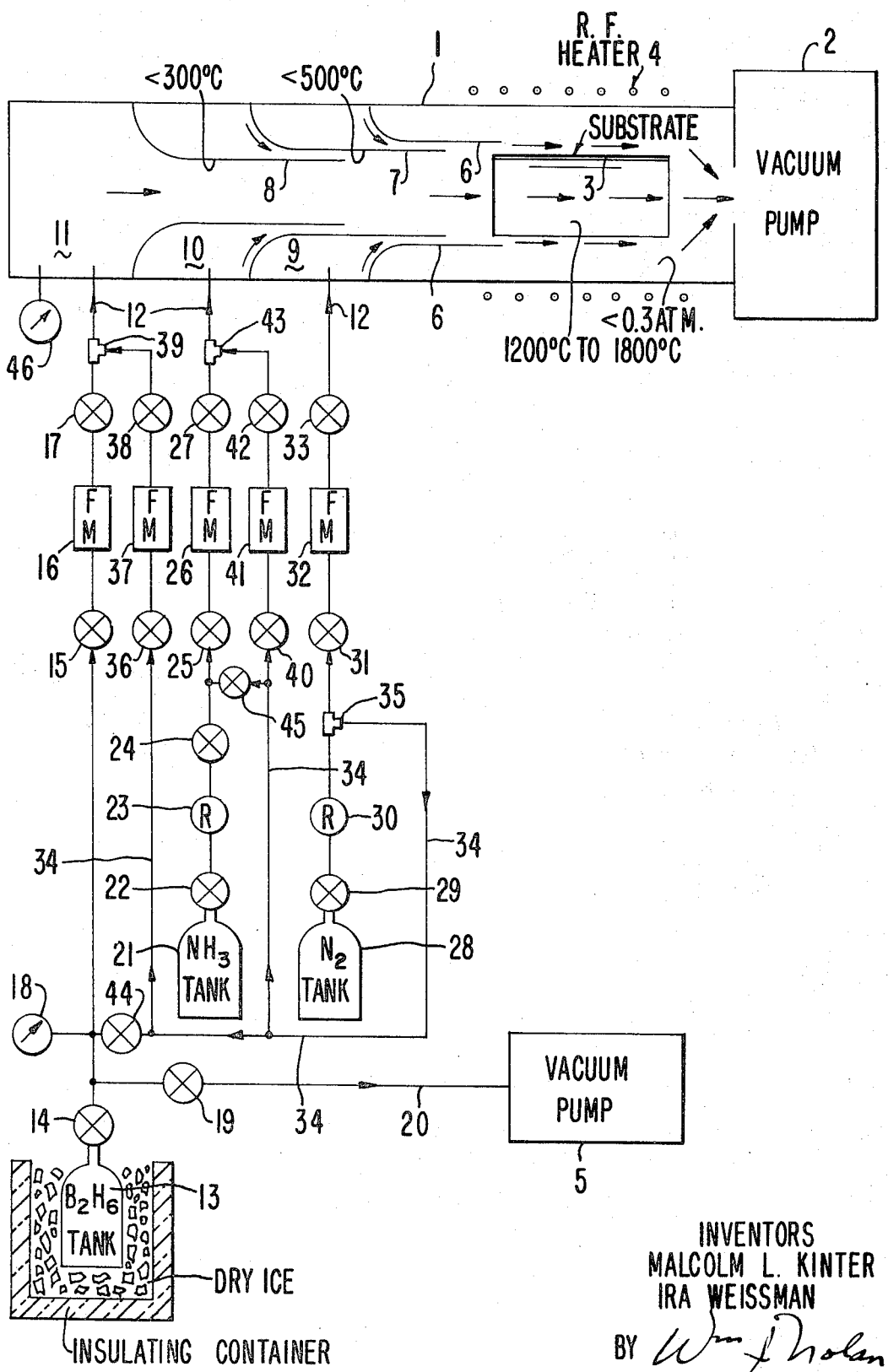

3,561,920
CHEMICAL VAPOR DEPOSITION OF THICK DEPOSITS OF ISOTROPIC BORON NITRIDE
Malcolm L. Kinter, Menlo Park, and Ira Weissman, Palo Alto, Calif., assignors to Varian Associates, Palo Alto, Calif., a corporation of California
Filed May 31, 1968, Ser. No. 733,348
Int. Cl. C01b 1/00, 21/06, 35/00
U.S. Cl. 23—191                7 Claims

ABSTRACT OF THE DISCLOSURE

Substrate member is heated to a suitable temperature in excess of 1200° C. in a deposition chamber partially evacuated to subatmospheric pressure. Diborane gas is reacted with ammonia gas within a temperature range of 200–300° C. to produce an intermediate gaseous reaction product. The intermediate gaseous reaction product is caused to flow across the heated substrate to cause decomposition of the gaseous reaction product with resultant deposition of a relatively thick deposit of isotropic boron nitride onto the heated substrate. In a preferred embodiment, the substrate member is tubular and coaxially aligned with a gaseous stream of the intermediate gaseous reaction product such that the gaseous stream flows through the interior of the tubular substrate for depositing the boron nitride on the interior surfaces of the tubular substrate. The diborane gas is introduced in a relatively inert carrier gas stream in a concentration of more than 50,000 parts per million diborane gas. The subatmospheric pressure within the deposition chamber is preferably less than $3/10$ of an atmosphere such that the concentration of the intermediate gaseous reaction product is relatively high and the probability that the reaction product will reach the interior wall of the substrate is relatively high to facilitate relatively rapid growth rates of the boron nitride and efficient utilization of the intermediate gaseous reaction product.

DESCRIPTION OF THE PRIOR ART

Heretofore, it has been proposed to deposit thin films of boron nitride by vapor deposition from a reaction between diborane and ammonia gases. In this prior method, the deposited films were relatively thin, e.g., falling within the range of 1000 to 6000 A. thick. The reaction was carried out at a temperature within the range of 600 to 1080° C. The diborane gas was introduced into a carrier stream with very low concentrations of diborane, for example, less than 400 parts per million in a nitrogen carrier gas and the deposition rate was approximately 1000 A. per minute. Such a prior method for depositing thin films of isotropic boron nitride is described in a paper presented at the Dallas meeting of the Electrochemical Society, as Abstract 87 in May 8–12 of 1967, pp. 42, 43. This paper was subsequently published in the Journal of the Electrochemical Society, April 1968, pp. 423–429.

While thin films of isotropic boron nitride may be useful for passivating semiconductor devices and for producing varistors, it is desirable to produce the isotropic boron nitride in relatively thick sheets or members, i.e., having a thickness in excess of 0.125″. These relatively thick deposits of isotropic boron nitride are suitable for forming insulative support structures for microwave circuit elements since such insulative members are characterized by high electrical resistivity, low dielectric constant on the order of 3 and low loss factor at microwave frequencies. In addition, the material has a high thermal conductivity and a coefficient of thermal expansion compatible with common refractory metals of tube construction such as molybdenum, tungsten and the like. In addition, the material has good thermal shock resistance and good mechanical strength.

Therefore, a need exists for a method for growing isotropic boron nitride in relatively thick deposits with relatively fast growth rates.

SUMMARY OF THE PRESENT INVENTION

The principal object of the present invention is the provision of an improved method for chemical vapor deposition of relatively thick deposits of isotropic boron nitride.

One feature of the present invention is the provision, in a method for chemical vapor deposition of isotropic boron nitride, of heating a substrate member disposed in a reaction chamber and onto which is to be deposited the boron nitride to a temperature in excess of 1200° C. and flowing the intermediate gaseous reaction product of a reaction of diborane gas with ammonia gas across the heated substrate at subatmospheric pressure to cause decomposition of the intermediate gaseous reaction product with attendant deposition of a relatively thick deposit of isotropic boron nitride onto the substrate.

Another feature of the present invention is the same as the preceding feature including the step of introducing the reactant diborane gas in a relatively inert carrier gas stream with a concentration of the diborane gas being greater than 50,000 parts per million, whereby the relatively high flow rates of reactant diborane gas are obtained at relatively high concentrations to facilitate rapid controlled growth of thick isotropic boron nitride deposits over extended lengths of the substrate.

Another feature of the present invention is the same as any one or more of the preceding features wherein the subatmospheric pressure within the deposition chamber is less than $3/10$ of an atmosphere, whereby the probability of the intermediate gaseous reaction product reaching the substrate is enhanced to facilitate rapid growth of the boron nitride deposit and efficient utilization of the intermediate gaseous reaction product.

Another feature of the present invention is the same as any one or more of the preceding features wherein the substrate is tubular and positioned in coaxial alignment with the stream of intermediate gaseous reaction product, and wherein the stream of intermediate gaseous reaction product is directed through the interior of the tubular substrate. A hollow tubular stream of relatively inert gas is provided around the outside of the stream of intermediate gaseous reaction product to act as a shield for confining the stream of intermediate gaseous reaction product to the interior of the substrate.

Other features and advantages of the present invention will become apparent upon a perusal of the following specification taken in connection with the accompanying drawings.

BRIEF DESCRIPTION OF THE DRAWINGS

The drawing is a schematic line diagram, partly in block diagram form, of an apparatus for practising the method of the present invention.

DESCRIPTION OF THE PREFERRED EMBODIMENTS

Referring to the drawing, there is shown the apparatus for depositing relatively thick deposits of isotropic boron nitride according to the method of the present invention. The apparatus includes a deposition chamber 1 evacuated to subatmospheric pressure preferably less than $3/10$ of an atmosphere by means of a vacuum pump 2. An absolute pressure gauge 46 accurately measures the subatmospheric pressure during operation. A substrate member 3, onto which the boron nitride is to be deposited, is disposed inside the deposition chamber 1 in a region so as to be inductively heated by means of an R.F. induction coil 4 disposed externally of the walls of the deposition chamber 1, as of quartz or alumina ceramic. A suitable frequency for the R.F. heater is 400 kilohertz. The substrate member 3 is preferably tubular in geometry and may comprise graphite or any one of a number of suitable metals such as, molybdenum, tungsten, tantalum, etc. The R.F. heater coil 4 heats the substrate to a temperature range from 1200° C. to 1800° C. and preferably in excess of 1300° C. The tubular substrate member 3 may be cylindrical or of rectangular cross section to produce cylinders or flat slabs of boron nitride. A substrate of rectangular cross section facilitates the formation of slabs of boron nitride since the tubular substrate with the deposit can be cut into planar wall members and the substrate removed to produce slab-shaped boron nitride members.

Three concentric quartz tubes 6, 7 and 8, respectively, are coaxially aligned with the tubular substrate 3 to define three concentric gaseous flow passageways for flowing gases axially through the interior of and around the outside of the substrate 3. The tubular members 6, 7 and 8 are outwardly flared and connected at their flared peripheries to the inside of the deposition chamber 1 to define three manifold chambers 9, 10 and 11 into which the gaseous reactants and carrier gases are injected from input manifolds 12.

Diborane gaseous reactant is supplied from a tank 13 containing diborane gas $B_2H_6$ preferably stored at Dry Ice temperature of less than −20° C. At this storage temperature the pressure within the tank is approximately 18 to 20 p.s.i.g. A suitable diborane gas is commercially available from Callery Chemical Co. of Callery, Pa. The diborane gas passes through a first valve 14 for valving off the tank 13 and thence through a metering valve 15 and via a flow meter 16 and valve 17 into manifold chamber 11. A pressure gauge 18 is connected between the valve 14 and metering valve 15 for measuring the pressure within the tank 13. In addition, a vacuum line 20 is connected from a vacuum pump 5 to the pipes leading from the diborane tank 13 to the manifold chamber 11 for selectively evacuating the piping to prevent the presence of explosive mixtures upon opening of the valve 14. A valve 19 is proided in the vacuum line 20 for valving off the vacuum pump 5 after the pipes have been evacuated.

Ammonia gaseous reactant is supplied from a tank 21 containing liquid ammonia at a pressure of approximately 114 p.s.i.g. The ammonia gas passes first through a valve 22 for valving off the tank 21 and then through a pressure regulator 23 where the pressure is reduced to approximately 10 p.s.i.g., after which the ammonia gas passes through a shut-off valve 24 and a metering valve 25 and via a flow meter 26 and valve 27 into manifold chamber 10.

Nitrogen gas, obtained from a high pressure tank 28 passes first through a valve 29 for valving off the tank 28 and then through a pressure regulator 30 where the pressure is reduced to approximately 20 p.s.i.g., after which the nitrogen gas passes through a metering valve 31 and via a flow meter 32 and a valve 33 into manifold chamber 9. In addition, a nitrogen line 34 is connected between the nitrogen regulator 30 and metering valve 31 via a T-connection 35 and supplies nitrogen gas to various points of the system as follows: Nitrogen gas from line 34 is passed through a metering valve 36 and via a flow meter 37 and a valve 38 and is admitted to the manifold system 12 through a T-connection 39. At T-connection 39 diborane gas emerging from valve 17 and nitrogen gas emerging from valve 38 intermix and pass together into manifold chamber 11. Simultaneously, nitrogen gas from line 34 is passed through metering valve 40 and via a flow meter 41 and valve 42 and is admitted to the manifold system 12 through a T-connection 43. At T-connection 43 ammonia gas emerging from valve 27 and nitrogen gas emerging from valve 42 intermix and pass together into manifold chamber 10. Also, nitrogen gas from line 34 is supplied to a valve 44 through which the diborane gas delivery system may be flushed out, and similarly nitrogen gas from line 34 is supplied to a valve 45 through which the ammonia gas delivery system may be flushed out.

In operation, the diborane gas, as carried in nitrogen carrier gas stream, is directed in the axial direction within the centermost tube 8. Nitrogen gas is preferred as a carrier gas because it is relatively inert in this reaction, does not introduce an additional gaseous species into the overall reaction, and is relatively inexpensive and compatible with the reactants and reaction products. Other suitable inert carrier gases include helium and argon. The center tube 8 is operated at a temperature less than 300° C. and greater than 200° C. The diborane gas is preferably not allowed to reach temperatures above 300° C. since, at temperatures of approximately 300° C. and above, diborane decomposes into elemental boron and hydrogen. In practice, a temperature of approximately 280° C. is preferred for the diborane gas. The concentration of diborane gas in the inert carrier gas stream is preferably greater than 50,000 parts per million in order to assure a relatively rich concentration of the reactant diborane gas to facilitate rapid growth of the boron nitride on the substrate 3. At the outlet end of the centermost tube 8, the diborane gas mixes with and reacts with the ammonia gas in tube 7 to produce intermediate gaseous reaction products. According to a text, "Boron, Metallo-Boron Compounds and Boranes," R. M. Adams, Ed., p. 590, Interscience, New York (1964), the reaction of diborane with ammonia is the most complex reaction of any amine. Also according to a text, "The Chemistry of Boron and Its Compounds," E. L. Muetterties, Ed., p. 388, John Wiley & Sons, New York (1967), the nature of the gaseous reaction products of diborane and ammonia is extremely sensitive to variations in the experimental procedures. A well known and typical intermediate product in the reaction of diborane and ammonia is produced according to the following equation:

$$2NH_3 + B_2H_6 \rightarrow B_2H_6 \cdot 2NH_3 \qquad (1)$$

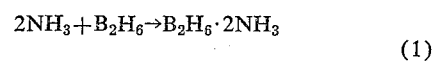

The gaseous amine-borane intermediate reaction product, namely, the diammoniate of diborane is an intermediate compound in the overall reaction and is a white solid at room temperature. Whether this is the exact intermediate product is not important to the overall reaction, since other possible intermediate reaction products are similar in that they form white solids at room temperature and will react on the heated substrate to form thick deposits of isotropic boron nitride. It is therefore necessary to keep the reaction product at a temperature above approximately 200° C.

The gaseous intermediate reaction product is carried by the gas stream into and through the interior of the heated substrate 3. That portion of the intermediate reaction product which contacts the surface of the substrate reacts on the substrate to form boron nitride according to the reaction:

$$B_2H_6 \cdot 2NH_3 \rightarrow 2BN + 6H_2 \qquad (2)$$

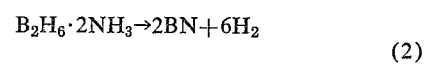

thus, completing the overall reaction. The temperature of the substrate 3 must be maintained above 1200° C. to achieve smooth homogeneous thick deposits of boron nitride on the substrate. Using lower temperatures results in an unstable mode of growth wherein the boron nitride deposits become nodular, irregular and non-homogeneous after the deposit has reached a thickness of the order of 0.010″. The prior art methods of depositing BN from diborane and ammonia have been confined to growing thinner deposits than 0.010″ and therefore have not encountered such uncontrolled, unstable growth modes.

The relatively inert carrier gas which is introduced into chamber 9 produces a hollow tubular stream of relatively inert gas surrounding the stream of reaction product, thereby serving as a shield to prevent the gaseous intermediate reaction product from contacting surfaces within the deposition chamber other than the desired interior surfaces of the substrate. The outer tube 6 which defines the outer diameter of the inert gas stream is preferably maintained at a temperature less than 500° C. to prevent deposition of boron nitride on the tube 6. In the gaseous reaction zone, at the confluence of the diborane gas stream and the ammonia gas stream, the molar ratio of ammonia to diborane is preferably greater than 2 to 1 to prevent the deposition of free boron along with the desired deposition of boron nitride on the substrate 3.

The subatmospheric pressure within the deposition chamber 1 should be less than 3/10 of an atmosphere and preferably as low as 1/1000 of an atmosphere in order to increase the probability that the intermediate gaseous reaction product will contact the substrate before passing the full length of the substrate member 3. Although the diborane and ammonia gases need not be introduced in an inert carrier gas stream, the provision of the inert carrier gas stream increases the gas velocity of the mixture in the deposition chamber to facilitate uniform rapid growth of the boron nitride over an extended length of the substrate 3.

In the above described process, the deposited boron nitride product is uniquely characterized by a small grained isotropic crystal structure having a low density. In practice, boron nitride has been produced by the above process with a specific gravity in the range of 1.35 to 1.65, where the theoretical specific gravity for 100% dense boron nitride is 2.27. The measured dielectric constant at microwave frequencies of the boron nitride is proportional to the density such that isotropic boron nitride deposited according to the aforedescribed method, having a specific gravity of 1.5, has a relative dielectric constant of about 3.3.

The advantage of the method of the present invention is that boron nitride can readily be deposited to thicknesses greater than 0.125" to provide dielectric support structures for microwave circuit elements in microwave tubes. The method of the present invention provides substantially increased growth rates as compared to growth rates of the prior art developed for thin film deposition. For example, boron nitride has been deposited to thicknesses on the order of 0.125" in 20 hours, whereas according to the method of the prior art the deposition rate was on the order of 1000 A. per minute. Thus, the deposition according to the present method is approximately 25 times faster than the deposition method of the prior art.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:
1. In a method for chemical vapor deposition of a relatively thick layer of isotropic boron nitride comprising the steps of:
   heating a substrate member which is disposed in a deposition chamber and is suitable for vapor deposition of boron nitride; introducing diborane gas into a suitable inert carrier gas;
   reacting said diborane gas with ammonia gas to produce an intermediate gaseous product at a temperature sufficient to prevent substantial solidification of the intermediate gaseous product but less than a temperature which would cause substantial decomposition of the diborane gas; and
   flowing the intermediate gaseous product at subatmospheric pressure across the heated substrate to cause decomposition of the intermediate gaseous product with attendant deposition of a relatively thick deposit of isotropic boron nitride on to the heated substrate;
   the improvement comprising, maintaining a concentration of diborane gas in said carrier gas of more than 50,000 parts per million, heating the substrate member to a temperature of from about 1200° C. to about 1800° C., and flowing the intermediate gaseous product to form an isotropic boron nitride layer at least 10 mils in thickness.

2. The method of claim 1 wherein the step of reacting the diborane gas with the ammonia gas includes the step of, causing the intermediate reaction to occur within the temperature range of 200° to 300° C. to prevent formation of a solid at temperatures below 200° C. and to prevent undesired decomposition of the intermediate gaseous reaction product at temperatures above 300° C.

3. The method of claim 1 wherein said gaseous intermediate reaction of diborane with ammonia is caused to occur in the deposition chamber.

4. The method of claim 1 wherein the subatmospheric pressure within the deposition chamber is less than 3/10 of an atmosphere to facilitate efficient utilization of the intermediate reaction product and rapid growth of the boron nitride.

5. The method of claim 1 wherein the substrate is formed of a tubular shape and is positioned in coaxial alignment with the stream of intermediate gaseous reaction product, and including the step of, directing the stream of intermediate gaseous reaction product through the interior of the tubular substrate for depositing the boron nitride on the interior surfaces of the tubular substrate.

6. The method of claim 5 wherein the step of directing the stream of intermediate gaseous reaction product through the interior of the tubular substrate includes the step of, directing a hollow tubular stream of relatively chemically inert gas as a shield around the outside of the stream of intermediate gaseous reaction product and around the outside of the tubular substrate for confining the stream of intermediate gaseous reaction product to the interior of the substrate.

7. The method of claim 1 wherein the diborane gas is reacted with the ammonia gas in molar ratios of ammonia to diborane greater than 2 to 1 to prevent the deposition of free boron along with the desired deposition of boron nitride.

References Cited

UNITED STATES PATENTS 2,832,672   4/1958   Fetterley et al. __ 23—204III V

FOREIGN PATENTS 28,659   12/1965   Japan _____ 23—191

OTHER REFERENCES

Rand et al.: "Preparation and Properties of Thin Film Boron Nitride," Electrochemical Society, April 1968, pp. 423–429, TP 250A54j.

OSCAR R. VERTIZ, Primary Examiner

H. S. MILLER, Assistant Examiner

U.S. Cl. X.R.

23—210, 358